(12) United States Patent
Zhang et al.

(10) Patent No.: US 11,479,447 B2
(45) Date of Patent: Oct. 25, 2022

(54) MINIATURE HANDHELD ELECTRIC TRACTION DEVICE

(71) Applicant: ZHEJIANG NOWVOW MECHANICAL AND ELECTRICAL CORP., LTD, Zhejiang (CN)

(72) Inventors: Guogang Zhang, Zhejiang (CN); Keqian Xiao, Zhejiang (CN); Kan Tang, Zhejiang (CN); Chunxiang Zhang, Zhejiang (CN); Liangdao Tang, Zhejiang (CN); Renyi Zhang, Zhejiang (CN)

(73) Assignee: ZHEJIANG NOWVOW MECHANICAL AND ELECTRICAL CORP LTD, Zhejiang (CN)

( * ) Notice: Subject to any disclaimer, the term of this patent is extended or adjusted under 35 U.S.C. 154(b) by 408 days.

(21) Appl. No.: 16/630,899

(22) PCT Filed: Feb. 28, 2018

(86) PCT No.: PCT/CN2018/077500
§ 371 (c)(1),
(2) Date: Jan. 14, 2020

(87) PCT Pub. No.: WO2019/140743
PCT Pub. Date: Jul. 25, 2019

(65) Prior Publication Data
US 2020/0148513 A1 May 14, 2020

(30) Foreign Application Priority Data
Jan. 16, 2018 (CN) .......................... 201810039516.5

(51) Int. Cl.
*H02K 7/102* (2006.01)
*B66D 1/22* (2006.01)
(Continued)

(52) U.S. Cl.
CPC ................. *B66D 1/22* (2013.01); *B66D 1/12* (2013.01); *B66D 1/46* (2013.01); *H02K 5/207* (2021.01);
(Continued)

(58) Field of Classification Search
CPC ........ H02K 7/085; H02K 7/102; H02K 7/116; H02K 7/145
See application file for complete search history.

(56) References Cited

U.S. PATENT DOCUMENTS

| 4,096,404 A | 6/1978 | Sukhanov et al. |
| 7,850,145 B2 | 12/2010 | Heravi et al. |
| 2013/0000132 A1* | 1/2013 | Bergquist ................ B27B 17/08 173/217 |

FOREIGN PATENT DOCUMENTS

| CN | 103130141 A | 6/2013 |
| CN | 205973563 U | 2/2017 |
| GB | 553870 A | 6/1943 |

OTHER PUBLICATIONS

International Search Report of PCT Patent Application No. PCT/CN2018/077500 dated Apr. 18, 2018.

* cited by examiner

*Primary Examiner* — Dang D Le
(74) *Attorney, Agent, or Firm* — NZ Carr Law Office

(57) ABSTRACT

A miniature handheld electric traction device including a shell, a power supply part, a power motor, a reduction gear set, a braking part and a winding drum, wherein the power motor, the reduction gear set and the winding drum are arranged in the shell; the power motor is linked with the winding drum through the reduction gear set; a surface of the winding drum is wound with a traction rope; the reduction gear set includes a planetary gear; the sun gear of the planetary gear is coaxial with the winding drum; the power (Continued)

motor or the motor shaft of the power motor is inserted into the inner ring of the winding drum; the motor shaft is linked with the planetary gear.

20 Claims, 3 Drawing Sheets

(51) Int. Cl.
    *H02K 11/30*     (2016.01)
    *B66D 1/12*     (2006.01)
    *B66D 1/46*     (2006.01)
    *H02K 5/22*     (2006.01)
    *H02K 7/08*     (2006.01)
    *H02K 7/116*     (2006.01)
    *H02K 11/00*     (2016.01)
    *H02K 5/20*     (2006.01)
(52) U.S. Cl.
    CPC ............. *H02K 5/225* (2013.01); *H02K 7/085* (2013.01); *H02K 7/102* (2013.01); *H02K 7/116* (2013.01); *H02K 11/0094* (2013.01); *H02K 11/30* (2016.01); *H02K 2205/09* (2013.01); *H02K 2213/06* (2013.01)

MINIATURE HANDHELD ELECTRIC TRACTION DEVICE

FIELD OF THE INVENTION

The disclosure relates to the field of mechanical traction, in particular to a miniature handheld electric traction device.

BACKGROUND OF THE INVENTION

The electric traction device is widely applied in various industries. During use, the electric traction device is hung on the supporting mechanism, and then the winding drum is driven by the driving mechanism of the electric traction device to rotate, so that the traction rope wound on the winding drum is driven to move.

The United States Patent with publication No. U.S. Pat. No. 7,850,145B2 disclosed a hand-held portable tool, which is different from a traditional electric traction device. The main body of the traditional electric traction device is a fixed point, and a chain rope led out of the main body is hung on the traction object. The structure of the application is that the main body is hooked on the traction object and moves together with the traction object. The handheld portable tool is small in tensile force and small in overall size, so that the handheld portable tool is convenient to detach and hook, and can be conveniently used.

However, the layout structure of the winding drum and the transmission gear set of the patent is not exquisite enough, the winding drum and the motor are in parallel and positioned at side-by-side deviation, and the arrangement of the gear set is large in span position, so that the overall size of the winding drum and the transmission gear set cannot be effectively reduced.

SUMMARY OF THE INVENTION

The disclosure aims to provide a miniature handheld electric traction device aiming at the existing problems.

The purpose of the disclosure can be realized by the following technical scheme: A miniature handheld electric traction device may include a shell, a power supply part, a power motor, a reduction gear set, a brake part and a winding drum, wherein the power motor, the reduction gear set and the winding drum may be arranged in the shell, the power supply part may be connected with the power motor, and a control circuit may be arranged between the power supply part and the power motor, the power motor may be linked with the winding drum via the reduction gear set, a traction rope may be wound on the surface of the winding drum, one end of the traction rope may be a free end, and a hook may be arranged outside the shell, wherein the reduction gear set may include a planetary gear, the sun gear of the planetary gear may be coaxial with the winding drum, the winding drum may be in transmission connection with the planetary gear, the power motor or the motor shaft of the power motor may be inserted into the inner ring of the winding drum, and the motor shaft may be linked with the planetary gear.

Preferably, the power motor, the winding drum and the sun gear of the planetary gear may be coaxially arranged.

Preferably, the reduction gear set may include a one-stage or multi-stage transmission planetary gear.

Preferably, the brake part may be arranged on the gear set and may include a few-tooth-difference planetary gear, and the sun gear of the few-tooth-difference planetary gear may be coaxial with the sun gear of the planetary gear.

Preferably, an inner cylinder sleeve may be arranged in the shell, the power motor may be fixed in the inner cylinder sleeve of the shell, a connecting shaft sleeve may be arranged on a motor shaft of the power motor, an annular space may be formed between the connecting shaft sleeve and the inner wall of the inner cylinder sleeve, the brake part further may include a variable-diameter rectangular spring, the variable-diameter rectangular spring may be inserted into the space, and the variable-diameter rectangular spring distributedly abuts the inner wall of the inner cylinder sleeve and the outer surface of the connecting shaft sleeve.

Preferably, the power motor may be fixed in the inner cylinder sleeve of the shell, the winding drum may be sleeved outside the inner cylinder sleeve, and a sliding bearing may be arranged between the winding drum and the inner cylinder sleeve.

Preferably, a spiral winding groove may be formed in the surface of the winding drum, a wire pressing plate may be arranged on the shell, the wire pressing plate may be hinged to the machine shell, an elastic torsion component may be arranged at the hinged position, and one side of the wire pressing plate may be towards the surface of the winding drum.

Preferably, the winding ratio of the diameter of the winding drum to the diameter of the traction rope may be larger than or equal to 16.

Preferably, a rope outlet may be formed in the shell, the free end of the traction rope penetrates out of the rope outlet, and rolling columns may be arranged on the two sides of the rope outlet.

Preferably, the shell may include an intermediate and covers on the two sides, a grip may be arranged on the intermediate, the intermediate may be made of a metal material, and the power motor, the reduction gear set, the brake part and the winding drum may be all connected to the intermediate.

Preferably, the intermediate may be provided with a heat dissipation hole.

Preferably, an emergency stop switch may be arranged outside the shell, and the emergency stop switch may be connected with the control circuit.

Preferably, an electrical placement cavity may be formed in the shell, the control circuit may be arranged in the electrical placement cavity, an insulation sleeve may be arranged on the inner wall of the electrical placement cavity, the thickness difference between the insulation sleeve and the inner wall of the electrical placement cavity may be at least 4 mm, and a convex rib may be arranged on the insulation sleeve at one side facing the electrical placement cavity.

Preferably, the power motor may be a high-speed and low-torque permanent magnet DC motor, the power supply part may be a battery, the battery may be detachably connected to the shell, and the battery may be a rechargeable battery.

Preferably, the power motor may be an alternating current motor, the power supply part may be a wire and a plug, and the plug may be connected with an external power grid for power supply.

Compared with the prior art, the disclosure has the advantages that: 1. the length of the traction tool may be greatly reduced, and the body size might be more simplified; 2. double brake protection and emergency stop control may be provided, so that the safety may be improved; 3. the diameter of the winding drum and the diameter of the traction rope adopt a large winding ratio, so that the winding rope might be well distributed during winding, and knotting may be prevented.

BRIEF DESCRIPTION OF THE DRAWINGS

Additional aspects and advantages of the disclosure will not only be learned from the claims, but also from the following description of preferred illustrative embodiments of the disclosure, and the preferred illustrative embodiments of the disclosure are explained below with reference to the figures, in which :

Figure 1:
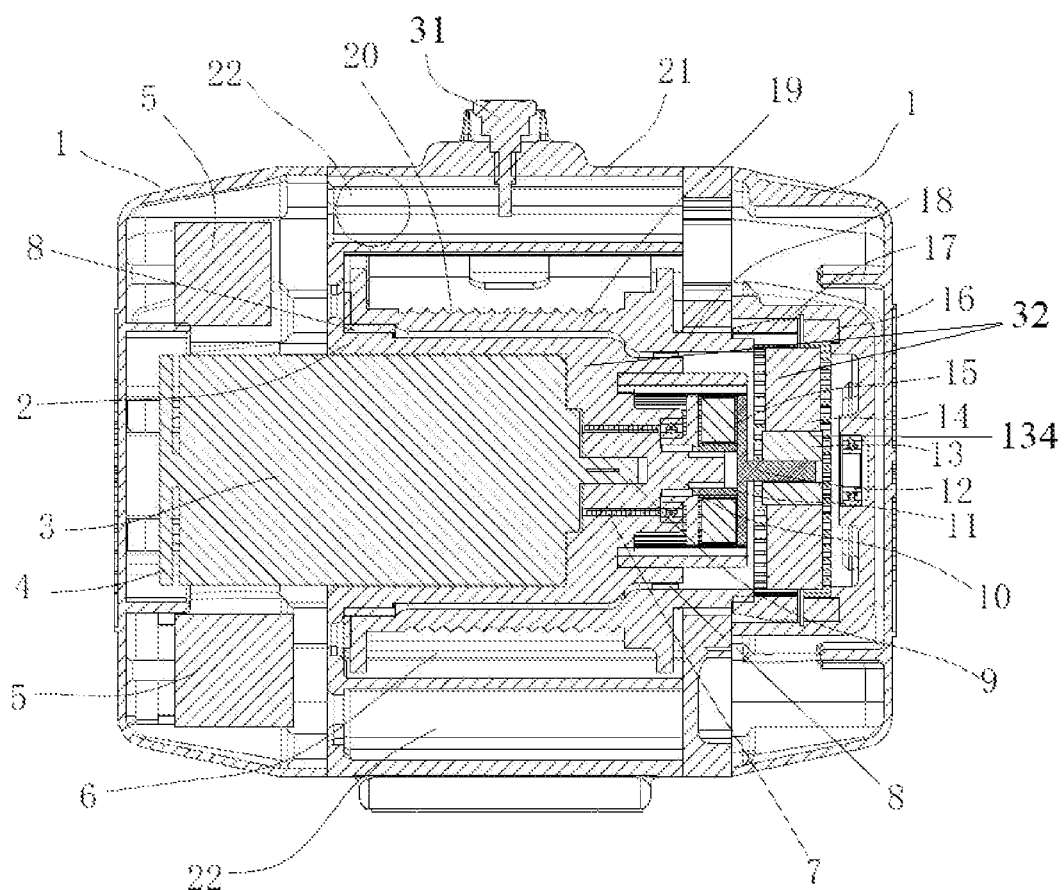
FIG. 1 is a schematic diagram of the internal structure arrangement according to the invention.
Figure 2:
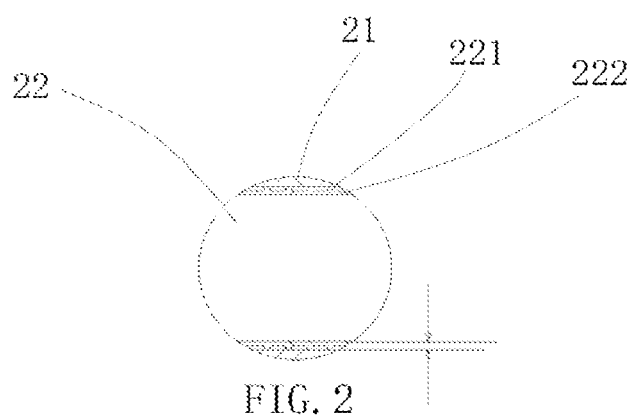
FIG. 2 is a schematic view of the electrical placement cavity.
Figure 3:
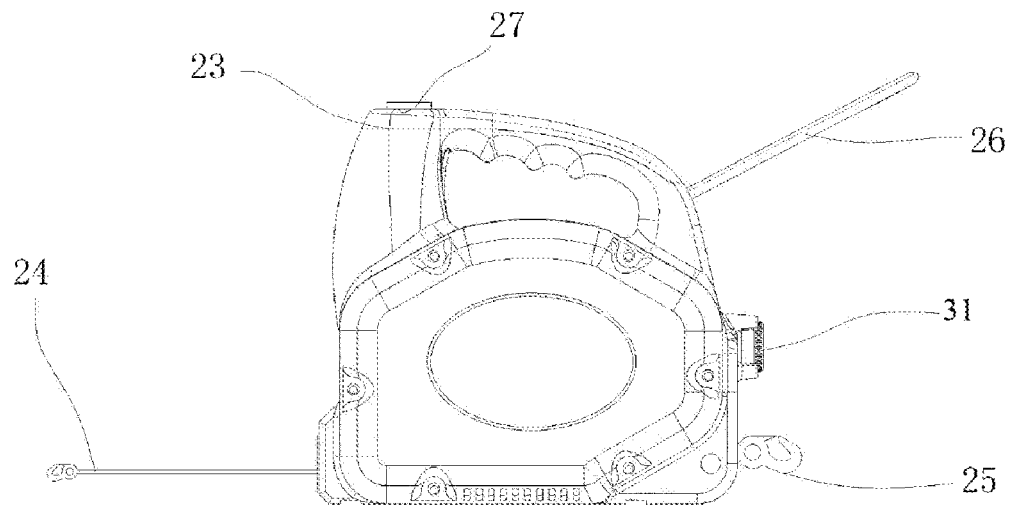
FIG. 3 is a schematic structural diagram with using an alternating current energy supply for the miniature handheld electric traction device according to the first embodiment.
Figure 4:
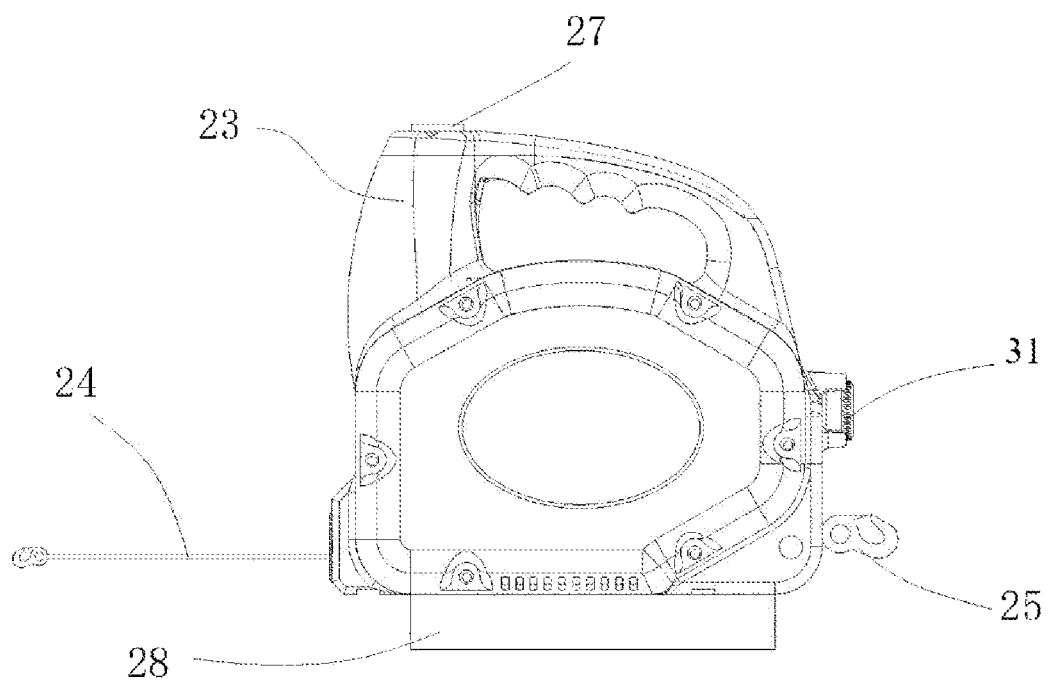
FIG. 4 is a schematic structural diagram with using a battery energy supply for the miniature handheld electric traction device according to the second embodiment.
Figure 5:
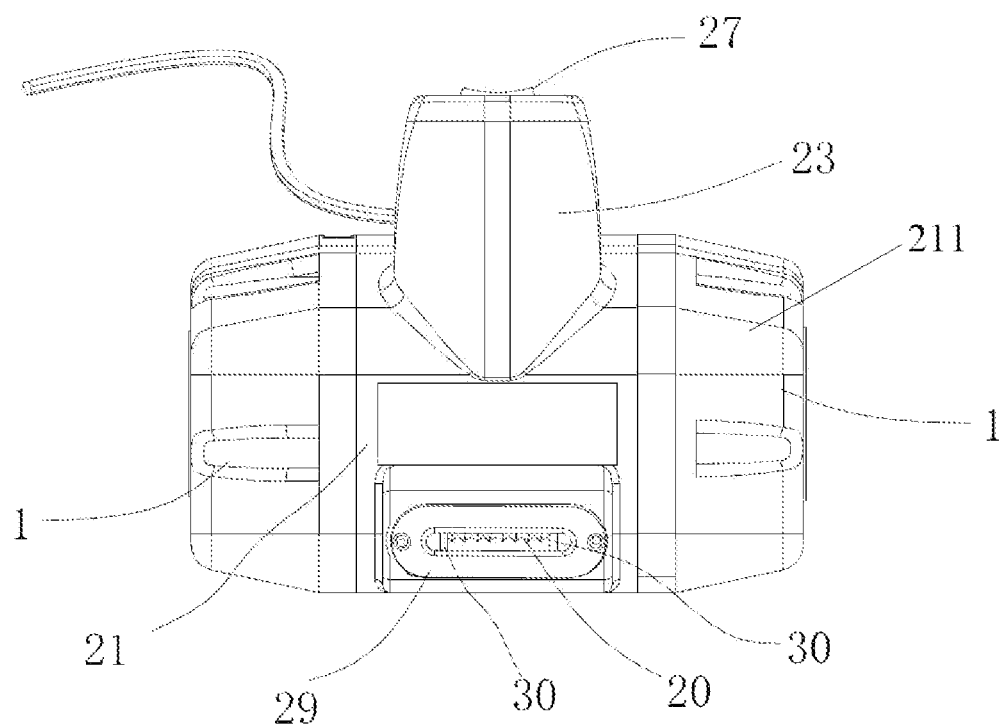
FIG. 5 is a schematic view of a rope outlet.

Wherein, 1, cover; 2, inner cylinder sleeve; 3, power motor; 4, fan; 5, electronic components; 6, wire pressing plate; 7, variable-diameter rectangular spring; 8, sliding bearing; 9, motor shaft; 10, connecting shaft sleeve; 11, first sun gear; 12 connecting shaft; 13, second sun gear; 14, second star wheel; 15, first star wheel; 16, fixed gear ring; 17, movable gear ring; 18, winding drum connecting gear ring; 19, winding drum; 20, winding groove; 21, intermediate; 22, electrical placement cavity; 221, convex rib; 222, insulation sleeve; 23, grip; 24, traction rope; 25, hook; 26, wire; 27, start switch; 28, battery; 29, rope outlet; 30, rolling column; 211, shell; 134, few-tooth-difference planetary gear; 31,emergency stop switch; 32, brake part.

DETAILED DESCRIPTION OF THE INVENTION

The present disclosure is further described below with reference to the accompanying drawings and the embodiments.

The embodiment provides a miniature handheld electric traction device, and it may include a shell 211, wherein the shell 211 may be composed of three parts, namely intermediate 21 and cover 1 at both ends. In order to enhance strength, the intermediate 21 may be made of a metal material.

The middle of the intermediate 21 may be provided with an inner cylinder sleeve 2, the inner cylinder sleeve 2 and the intermediate 21 may be of an integrated structure, a winding drum 19 may be sleeved outside the inner cylinder sleeve 2, a sliding bearing 8 may be arranged between the winding drum 19 and the inner cylinder sleeve 2, and the winding drum 19 may roll in relative to the inner cylinder sleeve 2. A spiral winding groove 20 may be provided on the winding drum 19, a wire pressing plate 6 may be also arranged thereon, the wire pressing plate 6 may be hinged to the intermediate 21, a torsion spring may be arranged at the hinged position, such that the wire pressing plate 6 may be pressed on the surface of the winding drum 19 at one side, and the wire pressing plate 6 can be turned during winding.

A power motor 3 may be inserted into the inner ring of the inner cylinder sleeve 2, a fan 4 may be arranged at the tail of the power motor 3, and the power motor 3 may be connected with the winding drum 19 through a reduction gear set. In alternative embodiment, the power motor 3 can be arranged on one side of the inner cylinder sleeve 2, and the motor shaft 9 can penetrate through the inner cylinder sleeve 2 and reach the other side, and it can be connected with the reduction gear set. For example, the power motor 3 can be arranged on one side of the inner cylinder sleeve 2, a multi-stage transmission gear may be arranged in the inner cylinder sleeve 2, and the motor shaft 9 may be firstly connected with the transmission gear and then transmitted to the reduction gear set on the other side of the inner cylinder sleeve 2. Preferably, the power motor 3 may be inserted into the inner cylinder sleeve 2 and may be concentric with the inner cylinder sleeve 2, and may be also concentric with the winding drum 19, which may be a method for reducing the overall size of the machine.

The reduction gear set may include a one-stage or multi-stage transmission planetary gear, a multi-stage transmission gear can be additionally arranged, and the sun gear of the planetary gear may be concentric with the winding drum 19. The preferable setting method may be as follows:

The motor shaft 9 may be connected with the connecting shaft sleeve 10, the connecting shaft sleeve 10 may be connected with the primary planetary gear, and specifically, the connecting shaft sleeve 10 may be connected with the first sun gear 11, the first sun gear 11 may be linked with the first star wheel 15, the first star wheel 15 drives the first gear ring to rotate, and primary speed reduction may be achieved.

Secondly, the first gear ring may be connected with the connecting shaft 12, the connecting shaft 12 may be connected with the few-tooth-difference planetary gear 134, and specifically, the connecting shaft 12 may be connected with the second sun gear 13, the second sun gear 13 may be linked with the second star wheel 14, and the second star wheel 14 drives the second gear ring to rotate. The second gear ring may include a fixed gear ring 16 and a movable gear ring 17, the fixed gear ring 16 serves as a relatively fixed one, when the second sun gear 13 rotates reversely, the second star wheel 14 cannot be driven to rotate, and the fixed gear ring 16 clamps the second star wheel 14. The movable gear ring 17 rotates along with the rotation of the second star wheel 14. The movable gear ring 17 may be also used as an output part of the rotating speed of the few-tooth-difference planetary gear 134.

The winding drum 19 may be provided with a winding drum connecting gear ring 18 at one side, and the winding drum connecting gear ring 18 may be in meshed transmission with the movable gear ring 17.

Of course, in order to reduce the rotation speed, the planetary gear set can be increased.

The few-tooth-difference planetary gear 134 may be used as a brake part 32, but a set of braking may be further added for insurance, an annular space may be formed between the inner wall of the connecting shaft sleeve 10 and the inner wall of the inner cylinder sleeve 2, a variable-diameter rectangular spring 7 may be inserted in the space, and the variable-diameter rectangular spring 7 distributedly abuts the inner wall of the inner cylinder sleeve 2 and the outer surface of the connecting shaft sleeve 10. When the connecting shaft sleeve 10 rotates clockwise, the variable-diameter rectangular spring 7 can also rotates clockwise, and get wrapped and reduced in diameter, and at the moment, the connecting shaft sleeve 10 may be separated from the inner cylinder sleeve 2; when the connecting shaft sleeve 10 may be reversed, the variable-diameter rectangular spring 7 rotates reversely and becomes larger in diameter under the friction effect; at the moment, the connecting shaft sleeve 10 may be tightly combined with the inner cylinder sleeve 2, so that the connecting shaft sleeve 10 and the whole transmission system may be limited to rotate, and the braking effect may be achieved.

An integrated grip 23 may be arranged on the intermediate 21, and a starting switch 27 may be arranged on the grip 23, the starting switch 27 may be connected with the control circuit, the control circuit may include electronic component 5 and circuit part. An electrical placement cavity 22 may be arranged inside the intermediate 21 corresponding to the circuit part, an insulation device may be arranged in order to prevent leakage of current, the insulation device may include an insulation sleeve 222, the insulation sleeve 222 and the inner wall of the electrical placement cavity 22 have a thickness difference of at least 4 mm, a protruding rib 221 may be arranged on the insulation sleeve 222 at one side facing the electrical placement cavity 22. When the insulation sleeve 222 may be embedded or taken out, friction may be reduced because of the protruding rib 221.

An emergency stop switch 31 may be further arranged outside the shell 211 and may be used as an emergency shut-off, so that the safety may be enhanced again.

A hook 25 may be arranged on the shell 211, a traction rope 24 may be also arranged and wound on the winding drum 19, the traction rope 24 may be pulled out from the tail of the intermediate 21, and in order to prevent the traction rope 24 from rubbing to two sides of the rope outlet 29 to form a notch, a number of rolling columns 30 may be arranged at two sides of the rope outlet 29, to make it changed into rolling friction. The winding ratio of the diameter of the winding drum 19 to the diameter of the rope may be larger than or equal to 16, and the breaking tensile force of the rope may be larger than or equal to 2 times of the rated load.

The power supply part may be used in an embodiment, the battery 28 can be used for supplying power, the power motor may be a high-speed and low-torque permanent magnet DC motor, the battery 28 may be detachably connected below the shell 211, and the battery 28 may be a rechargeable battery 28.

In another embodiment, the power motor 3 may be an alternating current motor, the power supply part may be a wire 26 and a plug, the plug may be connected with an external power grid for supplying power, the working voltage may be respectively AC220V and AC110V, under the rated load, the working current of the AC220V product may be less than or equal to 8.5A, the lifting speed may be larger than or equal to 2 m/min, the descending speed may be larger than or equal to 3.5 m/min, the working current of the AC 110V product may be less than or equal to 15A, the lifting speed may be larger than or equal to 2 m/min, and the descending speed may be larger than or equal to 3.5 m/min.

It may be to be understood that the above embodiments only express the preferred embodiments of the present disclosure, and the description may be specific and detailed, but may be not to be construed as a limitation to the scope of the present disclosure. It should be noted that, for persons of ordinary skill in the art, the technical features can be freely combined without departing from the concept of the present disclosure, and other modifications and improvements can be made, which belong to the protection scope of the present disclosure. Therefore, equivalent changes and modifications made without departing from the scope of the present disclosure shall fall within the scope of the claims of the present disclosure.

What is claimed:

1. A miniature handheld electric traction device comprising a shell, a power supply part and a power motor, a reduction gear set, a brake part and a winding drum; the power motor, the reduction gear set and the winding drum arranged in the shell; the power supply part connected with the power motor; a control circuit arranged between the power supply part and the power motor; the power motor linked with the winding drum through the reduction gear set; a traction rope wound on a surface of the winding drum; one end of the traction rope being a free end; and a hook arranged outside the shell; wherein the reduction gear set comprises a planetary gear, a sun gear of the planetary gear is coaxial with the winding drum, the winding drum is in transmission connection with the planetary gear, and a motor shaft of the power motor is linked with the planetary gear; the brake part is arranged on the reduction gear set and comprises a few-tooth-difference planetary gear, and a sun gear of the few-tooth-difference planetary gear is coaxial with the sun gear of the planetary gear; an inner cylinder sleeve is arranged in the shell; the power motor is fixed in the inner cylinder sleeve of the shell; a connecting shaft sleeve is arranged on the motor shaft of the power motor; an annular space is formed between the connecting shaft sleeve and the inner wall of the inner cylinder sleeve; the brake part further comprises a variable-diameter rectangular spring; the variable-diameter rectangular spring is inserted into the annular space; the variable-diameter rectangular spring is distributed on the inner wall of the inner cylinder sleeve and an outer surface of the connecting shaft sleeve.

2. The miniature handheld electric traction device according to claim 1, wherein the power motor or the motor shaft of the power motor is inserted into the inner ring of the winding drum.

3. The miniature handheld electric traction device according to claim 2, wherein the power motor, the winding drum and the sun gear of the planetary gear are coaxially arranged, and the reduction gear set comprises one-stage or multi-stage transmission planetary gears.

4. The miniature handheld electric traction device according to claim 2, wherein the power motor is fixed in the inner cylinder sleeve of the shell, the winding drum is sleeved outside the inner cylinder sleeve, and a sliding bearing is arranged between the winding drum and the inner cylinder sleeve.

5. The miniature handheld electric traction device according to claim 2, wherein a spiral winding groove is formed in the surface of the winding drum, a wire pressing plate is arranged on the shell, the wire pressing plate is hinged to the shell, an elastic torsion component is arranged at a hinged position, and one side of the wire pressing plate is towards the surface of the winding drum.

6. The miniature handheld electric traction device according to claim 2, wherein the winding ratio of the diameter of the winding drum to the diameter of the traction rope is larger than or equal to 16.

7. The miniature handheld electric traction device according to claim 2, wherein a rope outlet is provided in the shell, the free end of the traction rope penetrates out of the rope outlet, and a number of rolling columns are arranged on two sides of the rope outlet.

8. The miniature handheld electric traction device according to claim 2, wherein the shell comprises an intermediate and covers at two sides, a grip is arranged on the intermediate, the intermediate is made of metal material, and the power motor, the reduction gear set, the brake part and the winding drum are all connected to the intermediate.

9. The miniature handheld electric traction device to claim 2, wherein an electrical placement cavity is arranged in the shell, the control circuit is arranged in the electrical placement cavity, an insulation sleeve is arranged on the inner wall of the electrical placement cavity, the thickness difference between the insulation sleeve and the inner wall of the electrical placement cavity is at least 4 mm, and a convex rib is arranged on the insulation sleeve at one side facing the electrical placement cavity.

10. The miniature handheld electric traction device according to claim 1, wherein the power motor, the winding drum and the sun gear of the planetary gear are coaxially arranged, and the reduction gear set comprises one-stage or multi-stage transmission planetary gears.

11. The miniature handheld electric traction device according to claim 1, wherein the power motor is fixed in the inner cylinder sleeve of the shell, the winding drum is sleeved outside the inner cylinder sleeve, and a sliding bearing is arranged between the winding drum and the inner cylinder sleeve.

12. The miniature handheld electric traction device according to claim 1, wherein a spiral winding groove is formed in the surface of the winding drum, a wire pressing plate is arranged on the shell, the wire pressing plate is hinged to the shell, an elastic torsion component is arranged at a hinged position, and one side of the wire pressing plate is towards the surface of the winding drum.

13. The miniature handheld electric traction device according to claim 1, wherein the winding ratio of the diameter of the winding drum to the diameter of the traction rope is larger than or equal to 16.

14. The miniature handheld electric traction device according to claim 1, wherein a rope outlet is provided in the shell, the free end of the traction rope penetrates out of the rope outlet, and a number of rolling columns are arranged on two sides of the rope outlet.

15. The miniature handheld electric traction device according to claim 1, wherein the shell comprises an intermediate and covers at two sides, a grip is arranged on the intermediate, the intermediate is made of metal material, and the power motor, the reduction gear set, the brake part and the winding drum are all connected to the intermediate.

16. The miniature handheld electric traction device according to claim 15, wherein a heat dissipation hole is provided in the intermediate.

17. The miniature handheld electric traction device according to claim 1, wherein an emergency stop switch is arranged outside the shell, and the emergency stop switch is connected with a control circuit.

18. The miniature handheld electric traction device to claim 1, wherein an electrical placement cavity is arranged in the shell, the control circuit is arranged in the electrical placement cavity, an insulation sleeve is arranged on the inner wall of the electrical placement cavity, the thickness difference between the insulation sleeve and the inner wall of the electrical placement cavity is at least 4 mm, and a convex rib is arranged on the insulation sleeve at one side facing the electrical placement cavity.

19. The miniature handheld electric traction device according to claim 1, wherein the power motor is a high-speed and low-torque permanent magnet DC motor, the power supply portion is a battery, the battery is detachably connected to the shell, and the battery is a rechargeable battery.

20. The miniature handheld electric traction device according to claim 1, wherein the power motor is an alternating current motor, the power supply part comprises a wire and a plug, and the plug is connected with an external power grid for power supply.

* * * * *